United States Patent
Huang et al.

(10) Patent No.: US 12,242,948 B2
(45) Date of Patent: Mar. 4, 2025

(54) SYSTEMS AND METHODS FOR ROUTING WITHIN MULTITASK MIXTURE-OF-EXPERTS MODELS

(71) Applicant: Google LLC, Mountain View, CA (US)

(72) Inventors: Yanping Huang, Mountain View, CA (US); Dmitry Lepikhin, Sunnyvale, CA (US); Maxim Krikun, Castro Valley, CA (US); Orhan Firat, Mountain View, CA (US); Ankur Bapna, Sunnyvale, CA (US); Thang Luong, Santa Clara, CA (US); Sneha Kudugunta, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1000 days.

(21) Appl. No.: 17/159,437

(22) Filed: Jan. 27, 2021

(65) Prior Publication Data

US 2022/0237435 A1 Jul. 28, 2022

(51) Int. Cl.
*G06N 3/045* (2023.01)
*G06N 3/08* (2023.01)

(52) U.S. Cl.
CPC ........... *G06N 3/045* (2023.01); *G06N 3/08* (2013.01)

(58) Field of Classification Search
CPC ................................. G06N 3/045; G06N 3/08
See application file for complete search history.

(56) References Cited

U.S. PATENT DOCUMENTS

2021/0174170 A1* 6/2021 Tu .................... G06N 3/0454

OTHER PUBLICATIONS

Vaswani, Ashish, et al. "Attention is all you need." Advances in neural information processing systems 30. (Year: 2017).*
Zhou, Xinyuan, et al. "Self-and-mixed attention decoder with deep acoustic structure for transformer-based lvcsr." (Year: 2020).*
Shazeer, N., et al. "The sparsely-gated mixture-of-experts layer." (Year: 2017).*
Guo, et al., "Soft layer-specific multi-task summarization with entailment and question generation." (Year: 2018).*
Ryabinin, et al., "Towards crowdsourced training of large neural networks using decentralized mixture-of-experts." (Year: 2020).*
Kaiser, et al. "One model to learn them all." (Year: 2017).*
Maxime, What is a Transformer? An Introduction Transformers and Sequence-to-Sequence Learning for Machine Learning, Jan. 4, 2019, pp. 1-12.
Ostling, Robert, et al., Continuous multilinguality with language vectors, arXiv:1612.07486v1, Dec. 22, 2016, pp. 1-5.

(Continued)

*Primary Examiner* — Oluwatosin Alabi
*Assistant Examiner* — Matiyas T Maru
(74) *Attorney, Agent, or Firm* — Botos Churchill IP Law LLP (57) ABSTRACT

Systems and methods for routing in mixture-of-expert models. In some aspects of the technology, a transformer may have at least one Mixture-of-Experts ("MoE") layer in each of its encoder and decoder, with the at least one MoE layer of the encoder having a learned gating function configured to route each token of a task to two or more selected expert feed-forward networks, and the at least one MoE layer of the decoder having a learned gating function configured to route each task to two or more selected expert feed-forward networks.

18 Claims, 5 Drawing Sheets

(56) References Cited

OTHER PUBLICATIONS

Ostling, Robert, et al., Continuous multilinguality with language vectors, arXiv:1612.07486v2, Mar. 19, 2017, pp. 1-6.
Post, Matt, A Call for Clarity in Reporting BLEU Scores, WMT, vol. 1, 2018, pp. 186-191.
Raffel, Colin, et al., Exploring the Limits of Transfer Learning with a Unified Text-to-Text Transformer, arXiv:1910.10683v1, Oct. 23, 2019, pp. 1-52.
Raffel, Colin, et al., Exploring the Limits of Transfer Learning with a Unified Text-to-Text Transformer, arXiv:1910.10683v2, Oct. 24, 2019, pp. 1-53.
Raffel, Colin, et al., Exploring the Limits of Transfer Learning with a Unified Text-to-Text Transformer, arXiv:1910.10683v3, Jul. 28, 2020, pp. 1-67.
Riabinin, Maksim, Learning@home: Crowdsourced Training of Large Neural Networks with Decentralized Mixture-of-Experts, arXiv:2002.04013v1, Feb. 10, 2020, pp. 1-11.
Riabinin, Maksim, et al., Learning@Home: Crowdsourced Training of Large Neural Networks using Decentralized Mixture-of-Experts, arXiv:2002.04013v2, Jun. 14, 2020, pp. 1-15.
Riabinin, Maksim, et al., Learning@Home: Crowdsourced Training of Large Neural Networks using Decentralized Mixture-of-Experts, arXiv:2002.04013v3, Oct. 21, 2020, pp. 1-16.
Ruder, Sebastian, et al., Latent Multi-Task Architecture Learning, Association for the Advancement of Artificial Intelligence, 2019, pp. 4822-4829.
Shazeer, Noam, et al., Adafactor: Adaptive Learning Rates with Sublinear Memory Cost, arXiv:1804.04235v1, Apr. 11, 2018, pp. 1-9.
Shazeer, Noam, et al., Outrageously Large Neural Networks: The Sparsely-Gated Mixture-of-Experts Layer, arXiv:1701.06538v1, Jan. 23, 2017, pp. 1-19.
Siddhant, Aditya, et al., Leveraging Monolingual Data with Self-Supervision for Multilingual Neural Machine Translation, arXiv:2005.04816v1, May 11, 2020, pp. 1-9.
Srivastava, Shreya, Machine Translation (Encoder-Decoder Model)!, Analytics Vidhya, Oct. 31, 2019, pp. 1-15.
Tan, Xu, et al., Multilingual Neural Machine Translation with Knowledge Distillation, arXiv:1902.10461v1, Feb. 27, 2019, pp. 1-14.
Tan, Xu, et al., Multilingual Neural Machine Translation with Knowledge Distillation, arXiv:1902.10461v2, Feb. 28, 2019, pp. 1-14.
Tan, Xu, et al., Multilingual Neural Machine Translation with Knowledge Distillation, arXiv:1902.10461v3, Apr. 30, 2019, pp. 1-14.
Tan, Xu, et al., Multilingual Neural Machine Translation with Language Clustering, In Proceedings of the 2019 Conference on Empirical Methods in Natural Language Processing and the 9th International Joint Conference on Natural Language Processing, 2019, pp. 963-973.
Tiedemann, Jorg, Emerging Language Spaces Learned From Massively Multilingual Corpora, arXiv:1802.00273v1, Feb. 1, 2018, pp. 1-9.
Uszkoreit, Jakob, et al., Large Scale Parallel Document Mining for Machine Translation, In Proceedings of the 23rd International Conference on Computational Linguistics (Coling 2010), Computational Linguistics, 2010, pp. 1101-1109.
Vaswani, Ashish, et al., Attention Is All You Need, In Advances in Neural Information Processing Systems 30 (NIPS 2017), 2017, pp. 1-11.
Wang, Yining, et al., Three Strategies to Improve One-to-Many Multilingual Translation, In Proceedings of the 2018 Conference on Empirical Methods in Natural Language Processing, Association for Computational Linguistics, 2018, pp. 2955-2960.
Weng, Lilian, Attention?Attention!, Lil'Log, Jun. 24, 2018, pp. 1-29.
Weng, Lilian, The Transformer Family, Lil'Log, Apr. 7, 2020, pp. 1-24.
Wikipedia, Mixture of experts, Sep. 21, 2020 (1 page).
Wu, Shijie, et al., Beto, Bentz, Becas: The Surprising Cross-Lingual Effectiveness of BERT, arXiv:1904.09077v1, Apr. 19, 2019, pp. 1-12.
Wu, Shijie, et al., Beto, Bentz, Becas: The Surprising Cross-Lingual Effectiveness of BERT, arXiv:1904.09077v2, Oct. 3, 2019, pp. 1-12.
Yang, Brandon, et al., CondConv: Conditionally Parameterized Convolutions for Efficient Inference, In Advances in Neural Information Processing Systems 32 (NeurIPS 2019), 2019, pp. 1-12.
Zhang, Biao, et al., Improving Massively Multilingual Neural Machine Translation and Zero-Shot Translation, In Proceedings of the 58th Annual Meeting of the Association for Computational Linguistics, Association for Computational Linguistics, 2020, pp. 1628-1639.
Published comments from ICLR 2021 review of Kudugunta, Sneha, et al., Exploring Routing Strategies for Multilingual Mixture-of-Experts Models, https://openreview.net/forum?id=ey1XXNzcIZS, printed Jan. 26, 2021, pp. 1-6.
Alammar, Jay, The Illustrated Transformer, Visualizing machine learning one concept at a time, Jun. 27, 2018, pp. 1-23.
Arivazhagan, Naveen, et al., Massively Multilingual Neural Machine Translation in the Wild: Findings and Challenges, arXiv:1907.05019v1, Jul. 11, 2019, pp. 1-27.
Baldwin, Timothy T., et al., Transfer of Training: A Review and Directions for Future Research, Personnel Psychology, Spring 1988, 41, 1, pp. 63-105.
Bapna, Ankur, et al., Simple, Scalable Adaptation for Neural Machine Translation, Association for Computational Linguistics, 2019, pp. 1538-1548.
Bengio, Emmanuel, et al., Conditional Computation in Neural Networks for Faster Models, arXiv:1511.06297v1, Nov. 19, 2015, pp. 1-9.
Bengio, Emmanuel, et al., Conditional Computation in Neural Networks for Faster Models, arXiv:1511.06297v2, Jan. 7, 2016, pp. 1-12.
Bogoychev, Nikolay, et al., Domain, Translationese and Noise in Synthetic Data for Neural Machine Translation, arXiv:1911.03362v1, Nov. 6, 2019, pp. 1-11.
Bogoychev, Nikolay, et al., Domain, Translationese and Noise in Synthetic Data for Neural Machine Translation, arXiv:1911.03362v2, Oct. 3, 2020, pp. 1-14.
Brown, Tom B., et al., Language Models are Few-Shot Learners, arXiv:2005.14165v1, May 28, 2020, pp. 1-72.
Brown, Tom B., et al., Language Models are Few-Shot Learners, arXiv:2005.14165v2, Jun. 1, 2020, pp. 1-74.
Brown, Tom B., et al., Language Models are Few-Shot Learners, arXiv:2005.14165v3, Jun. 5, 2020, pp. 1-74.
Brown, Tom B., et al., Language Models are Few-Shot Learners, arXiv:2005.14165v4, Jul. 22, 2020, pp. 1-75.
Brownlee, Jason, A Gentle Introduction to the Rectified Linear Unit (ReLU), Machine Learning Mastery, Aug. 20, 2020, pp. 1-27.
Caruana, Rich, Multitask Learning, Machine Learning, 28, 1997, pp. 41-75.
Chen, Mia Xu, et al., The Best of Both Worlds: Combining Recent Advances In Neural Machine Translation, Association for Computational Linguistics, 2018, pp. 76-86.
Cheng, Yu, et al., A Survey of Model Compression and Acceleration for Deep Neural Networks, arXiv:1710.09282v2, Oct. 30, 2017, pp. 1-10.
Cheng, Yu, et al., A Survey of Model Compression and Acceleration for Deep Neural Networks, arXiv:1710.09282v3, Nov. 5, 2017, pp. 1-10.
Cheng, Yu, et al., A Survey of Model Compression and Acceleration for Deep Neural Networks, arXiv:1710.09282v4, Nov. 18, 2017, pp. 1-10.
Cheng, Yu, et al., A Survey of Model Compression and Acceleration for Deep Neural Networks, arXiv:1710.09282v5, Dec. 13, 2017, pp. 1-10.
Cheng, Yu, et al., A Survey of Model Compression and Acceleration for Deep Neural Networks, arXiv:1710.09282v6, Jan. 21, 2019, pp. 1-10.

(56) References Cited

OTHER PUBLICATIONS

Cheng, Yu, et al., A Survey of Model Compression and Acceleration for Deep Neural Networks, arXiv:1710.09282v7, Feb. 7, 2019, pp. 1-10.

Cheng, Yu, et al., A Survey of Model Compression and Acceleration for Deep Neural Networks, arXiv:1710.09282v8, Sep. 8, 2019, pp. 1-10.

Cheng, Yu, et al., A Survey of Model Compression and Acceleration for Deep Neural Networks, arXiv:1710.09282v9, Jun. 14, 2020, pp. 1-10.

Cheng, Yu, et al., Model Compression and Acceleration for Deep Neural Networks, arXiv:1710.09282v1, Oct. 23, 2017, pp. 1-10.

Clark, Kevin, et al., BAM! Born-Again Multi-Task Networks for Natural Language Understanding, arXiv:1907.04829v1, Jul. 10, 2019, pp. 1-7.

Collobert, Ronan, A Unified Architecture for Natural Language Processing: Deep Neural Networks with Multitask Learning, In Proceedings of the 25th International Conference on Machine Learning, 2008, pp. 1-8.

Elbayad, Maha, et al., Depth-Adaptive Transformer, arXiv:1910.10073v1, Oct. 22, 2019, pp. 1-12.

Elbayad, Maha, et al., Depth-Adaptive Transformer, arXiv:1910.10073v2, Dec. 16, 2019, pp. 1-14.

Elbayad, Maha, et al., Depth-Adaptive Transformer, arXiv:1910.10073v3, Dec. 19, 2019, pp. 1-14.

Elbayad, Maha, et al., Depth-Adaptive Transformer, arXiv:1910.10073v4, Feb. 14, 2020, pp. 1-15.

Fan, Angela, et al., Beyond English-Centric Multilingual Machine Translation, arXiv:2010.11125v1, Oct. 21, 2020, pp. 1-38.

Freitag, Markus, et al., APE at Scale and its Implications on MT Evaluation Biases, WMT, vol. 1, 2019, pp. 34-44.

Gu, Jiatao, et al., Universal Neural Machine Translation for Extremely Low Resource Languages, arXiv:1802.05368v1, Feb. 15, 2018, pp. 1-9.

Gu, Jiatao, et al., Universal Neural Machine Translation for Extremely Low Resource Languages, arXiv:1802.05368v2, Apr. 17, 2018, pp. 1-11.

Hinton, Geoffrey, et al., Distilling the Knowledge in a Neural Network, arXiv:1503.02531v1, Mar. 9, 2015, pp. 1-9.

Hokamp, Chris, et al., Evaluating the Supervised and Zero-shot Performance of Multi-lingual Translation Models, arXiv:1906.09675v1, Jun. 24, 2019, pp. 1-11.

Huang, Yanping, et al., GPipe: Efficient Training of Giant Neural Networks using Pipeline Parallelism, NeurIPS 2019, pp. 1-10.

Johnson, Melvin, et al., Google's Multilingual Neural Machine Translation System: Enabling Zero-Shot Translation, Transactions of the Association for Computational Linguistics, vol. 5, 2017, pp. 339-351.

Kasai, Jungo, et al., Deep Encoder, Shallow Decoder: Reevaluating the Speed-Quality Tradeoff in Machine Translation, arXiv:2006.10369v1, Jun. 18, 2020, pp. 1-14.

Kasai, Jungo, et al., Deep Encoder, Shallow Decoder: Reevaluating the Speed-Quality Tradeoff in Machine Translation, arXiv:2006.10369v2, Jun. 28, 2020, pp. 1-14.

Kim, Yoon, et al., Sequence-Level Knowledge Distillation, School of Engineering and Applied Sciences, Harvard University, Association for Computational Linguistics, 2016, pp. 1317-1327.

Kudo, Taku, et al., SentencePiece: A simple and language independent subword tokenizer and detokenizer for Neural Text Processing, arXiv:1808.06226v1, Aug. 19, 2018, pp. 1-6.

Kudugunta, Sneha, et al., Exploring Routing Strategies For Multilingual Mixture-of-Experts Models, Anonymously submitted to ICLR on Sep. 28, 2020, pp. 1-21.

Kudugunta, Sneha, et al., Exploring Routing Strategies For Multilingual Mixture-of-Experts Models, Revised Version Anonymously submitted to ICLR on Jan. 14, 2021, pp. 1-12.

Kudugunta, Sneha, et al., Investigating Multilingual NMT Representations at Scale, arXiv:1909.02197v1, Sep. 5, 2019, pp. 1-20.

Kudugunta, Sneha, et al., Investigating Multilingual NMT Representations at Scale, arXiv:1909.02197v2, Sep. 11, 2019, pp. 1-20.

Lepikhin, Dmitry, et al., GShard: Scaling Giant Models with Conditional Computation and Automatic Sharding, arXiv:2006.16668v1, Jun. 30, 2020, pp. 1-35.

Ma, Jiaqi, et al., Modeling Task Relationships in Multi-task Learning with Multi-gate Mixture-of-Experts, KDD, 2018, pp. 1930-1939.

Ma, Jiaqi, et al., SNR: Sub-Network Routing for Flexible Parameter Sharing in Multi-task Learning, AAAI, 2019, pp. 216-223.

\* cited by examiner

SYSTEMS AND METHODS FOR ROUTING WITHIN MULTITASK MIXTURE-OF-EXPERTS MODELS

BACKGROUND

As the size and complexity of neural network models has grown in recent years, increasing attention has been paid to optimizing training efficiency and inference efficiency. In that regard, while large models trained on large amounts of data can improve quality, particularly in natural language understanding and multilingual neural machine translation, large dense models are often prohibitively compute-intensive to train, with some models requiring thousands of GigaFlops-days of compute. One way to address training efficiency limitations is by substituting sparsely-gated Mixture-of-Experts ("MoE") layers into the model in place of one or more feed-forward network ("FFN") layers, and to route each token of a task to a different subset of the experts so that total computation cost per token becomes proportional to the size of the activated sub-network.

However, such an approach may lead to reductions in inference efficiency, as such large models often have enough parameters that the experts need to be hosted on more than one physical device (leading to increased serving costs and communication costs associated with routing tokens between the devices) or loaded dynamically (leading to communication costs associated with retrieving and loading the experts). In addition, as transformer models employ autoregressive decoding, the communication costs associated with each MoE layer of the decoder are multiplied by the number of decoding steps. Further, when routing by token, unless a large number of input tokens are batched together, only a subset of each MoE network will be activated, leading to device under-utilization.

On the other hand, it is possible to increase inference efficiency by routing by task boundaries. In such a case, all of the tokens for a given input sequence (e.g., a word, sentence fragment, sentence, paragraph, etc.) are routed to the same set of experts, requiring the server to only pre-load a single set of K experts for that task. However, given that some types of tasks will be more common than others (e.g., for a multi-lingual translation model, requests to translate text from English to Spanish may be more common than from Spanish to Italian), this routing strategy can lead to device under-utilization, as the experts associated with one type of task may end up bearing a disproportionate amount of the model's overall load.

The present technology thus provides systems and methods in which one or more MoE layers of the model's encoder routes by token, while one or more MoE layers of the model's decoder routes by task. This can still provide substantial advantages in training time over non-MoE models, as computing load may be balanced across a broad set of experts during training. In addition, this hybrid approach may reduce inference time over a purely token-based routing approach, as communication costs during the more time-consuming sequential decoding steps are confined to routing between a single subset of experts at each MoE layer for each task. Finally, by employing learned gating functions, the models of the present technology are able to learn which experts are most effective and/or efficient at processing a given token (in the encoder) or task (in the decoder). This can provide efficiencies over approaches in which a model's routing decisions are governed by deterministic rules set by human operators, as those deterministic rules may be based on flawed assumptions or other criteria that do not accurately reflect which experts are most suitable for processing a given task or token. In that regard, transformers utilizing the present technology may produce outputs that meet or exceed the quality of MoE models that route solely by token, while incurring a mere fraction of the serving cost. For example, in some cases, the transformers of the present technology have decoders that incur as little as 1.5-6.25% of the serving cost of purely token-based MoE models, while producing outputs of similar or better quality.

BRIEF SUMMARY

The present technology concerns systems and methods for routing in mixture-of-expert models. In that regard, in some aspects of the technology, a transformer may have at least one MoE layer in each of its encoder and decoder, with the at least one MoE layer of the encoder having a learned gating function configured to route each token of a task to two or more selected expert FFNs, and the at least one MoE layer of the decoder having a learned gating function configured to route each task to two or more selected expert FFNs.

In one aspect, the disclosure describes a computer-implemented method of processing an input sequence in a transformer having an encoder and a decoder, the encoder and the decoder each having one or more mixture-of-experts sublayers, the method comprising: (a) generating, by one or more processors of a processing system, a first tokenized input sequence based on the input sequence, the first tokenized input sequence comprising a plurality of tokens; (b) for each given token of the plurality of tokens: generating a first vector representing the given token; at a given mixture-of-expert sublayer of the one or more mixture-of-expert sublayers of the encoder, routing the first vector to two or more feed-forward networks of the encoder based on a first learned gating function; and generating a second vector based on processing the first vector in the two or more feed-forward networks of the encoder; (c) generating, by the one or more processors, a combined encoder output vector based on each second vector generated for each given token of the plurality of tokens; (d) for each given element of a plurality of elements in a target sequence vector: generating a third vector based on the combined encoder output vector and a target sequence vector; at a given mixture-of-expert sublayer of the one or more mixture-of-expert sublayers of the decoder, routing the third vector to two or more feed-forward networks of the decoder based on a second learned gating function; generating a fourth vector based on processing the third vector in the two or more feed-forward networks of the decoder; and modifying the given element of the target sequence vector based on the fourth vector. In some aspects, generating the first vector representing the given token comprises: processing the given token in an input embedding layer of the transformer; and processing the first tokenized input sequence in a positional embedding layer of the transformer to add positional information to the first vector representing where the given token exists within the first tokenized input sequence. In some aspects, generating the first vector representing the given token comprises: processing the given token in one or more embedding layers of the transformer to generate an initial vector representing the given token; and processing the initial vector in one or more layers of the encoder to generate the first vector. In some aspects, generating the combined encoder output vector comprises stacking each second vector generated for each given token of the plurality of tokens. In some aspects, the method further comprises, for each given token of the plurality of tokens, processing the second vector in one or more layers of the encoder to generate a final vector for the given token; and generating the combined encoder output vector based on each second vector generated for each given token of the plurality of tokens comprises generating the combined encoder output vector based on each final vector generated for each given token of the plurality of tokens. In some aspects, for each given element of a plurality of elements in the target sequence vector, generating the third vector based on the combined encoder output vector and a target sequence vector comprises: processing the target sequence vector in a masked multi-head attention sublayer of the decoder and a normalization sublayer of the decoder to generate an intermediate vector; and processing the combined encoder output vector and the intermediate vector in a multi-head attention sublayer of the decoder to generate the third vector. In some aspects, for each given element of a plurality of elements in the target sequence vector, generating the third vector based on the combined encoder output vector and a target sequence vector comprises: processing the target sequence vector in a masked multi-head attention sublayer of the decoder and a first normalization sublayer of the decoder to generate a first intermediate vector; processing the combined encoder output vector and the first intermediate vector in a multi-head attention sublayer of the decoder to generate a second intermediate vector; and processing the first intermediate vector and the second intermediate vector in a second normalization sublayer of the decoder to generate the third vector. In some aspects, the method further comprises, for each given element of a plurality of elements in the target sequence vector, processing the combined encoder output vector and the target sequence vector in a first layer of the decoder to generate a first layer output vector, and processing the first layer output vector in a masked multi-head attention sublayer of the decoder and a normalization sublayer of the decoder to generate an intermediate vector; and generating the third vector based on the combined encoder output vector and a target sequence vector comprises processing the combined encoder output vector and the intermediate vector in a multi-head attention sublayer of the decoder to generate the third vector. In some aspects, for each given element of a plurality of elements in the target sequence vector, modifying the given element of the target sequence vector based on the fourth vector comprises: concatenating the third vector and the fourth vector to generate a final decoder output vector; and assigning the final decoder output vector to the given element of the target sequence vector. In some aspects, for each given element of a plurality of elements in the target sequence vector, modifying the given element of the target sequence vector based on the fourth vector comprises: concatenating the third vector and the fourth vector to generate a fifth vector; processing the fifth vector in one or more layers of the decoder to generate a final decoder output vector; and assigning the final decoder output vector to the given element of the target sequence vector.

In another aspect, the disclosure describes a system for processing an input sequence, comprising: a memory; a transformer stored in the memory, the transformer having an encoder and a decoder, the encoder and the decoder each having one or more mixture-of-experts sublayers; and one or more processors coupled to the memory. The one or more processors are configured to: (a) generate a first tokenized input sequence based on the input sequence, the first tokenized input sequence comprising a plurality of tokens; (b) for each given token of the plurality of tokens: generate a first vector representing the given token; at a given mixture-of-expert sublayer of the one or more mixture-of-expert sublayers of the encoder, route the first vector to two or more feed-forward networks of the encoder based on a first learned gating function; and generate a second vector based on processing the first vector in the two or more feed-forward networks of the encoder; (c) generate a combined encoder output vector based on each second vector generated for each given token of the plurality of tokens; (d) for each given element of a plurality of elements in a target sequence vector: generate a third vector based on the combined encoder output vector and a target sequence vector; at a given mixture-of-expert sublayer of the one or more mixture-of-expert sublayers of the decoder, route the third vector to two or more feed-forward networks of the decoder based on a second learned gating function; generate a fourth vector based on processing the third vector in the two or more feed-forward networks of the decoder; and modify the given element of the target sequence vector based on the fourth vector. In some aspects, the generation of the first vector representing the given token comprises the one or more processors being configured to: process the given token in an input embedding layer of the transformer; and process the first tokenized input sequence in a positional embedding layer of the transformer to add positional information to the first vector representing where the given token exists within the first tokenized input sequence. In some aspects, the generation of the first vector representing the given token comprises the one or more processors being configured to: process the given token in one or more embedding layers of the transformer to generate an initial vector representing the given token; and process the initial vector in one or more layers of the encoder to generate the first vector. In some aspects, the generation of the combined encoder output vector comprises the one or more processors being configured to stack each second vector generated for each given token of the plurality of tokens. In some aspects, the one or more processors are further configured to, for each given token of the plurality of tokens, process the second vector in one or more layers of the encoder to generate a final vector for the given token; and the generation of the combined encoder output vector based on each second vector generated for each given token of the plurality of tokens comprises the one or more processors being configured to generate the combined encoder output vector based on each final vector generated for each given token of the plurality of tokens. In some aspects, for each given element of a plurality of elements in the target sequence vector, the generation of the third vector based on the combined encoder output vector and a target sequence vector comprises the one or more processors being configured to: process the target sequence vector in a masked multi-head attention sublayer of the decoder and a normalization sublayer of the decoder to generate an intermediate vector; and process the combined encoder output vector and the intermediate vector in a multi-head attention sublayer of the decoder to generate the third vector. In some aspects, for each given element of a plurality of elements in the target sequence vector, the generation of the third vector based on the combined encoder output vector and a target sequence vector comprises the one or more processors being configured to: process the target sequence vector in a masked multi-head attention sublayer of the decoder and a first normalization sublayer of the decoder to generate a first intermediate vector; process the combined encoder output vector and the first intermediate vector in a multi-head attention sublayer of the decoder to generate a second intermediate vector; and process the first intermediate vector and the second intermediate vector in a second normalization sublayer of the decoder to generate the third vector. In some aspects, the one or more processors are further configured to, for each given element of a plurality of elements in the target sequence vector, process the combined encoder output vector and the target sequence vector in a first layer of the decoder to generate a first layer output vector, and process the first layer output vector in a masked multi-head attention sublayer of the decoder and a normalization sublayer of the decoder to generate an intermediate vector; and the generation of the third vector based on the combined encoder output vector and a target sequence vector comprises the one or more processors being configured to process the combined encoder output vector and the intermediate vector in a multi-head attention sublayer of the decoder to generate the third vector. In some aspects, for each given element of a plurality of elements in the target sequence vector, the modification of the given element of the target sequence vector based on the fourth vector comprises the one or more processors being configured to: concatenate the third vector and the fourth vector to generate a final decoder output vector; and assign the final decoder output vector to the given element of the target sequence vector. In some aspects, for each given element of a plurality of elements in the target sequence vector, the modification of the given element of the target sequence vector based on the fourth vector comprises the one or more processors being configured to: concatenate the third vector and the fourth vector to generate a fifth vector; process the fifth vector in one or more layers of the decoder to generate a final decoder output vector; and assign the final decoder output vector to the given element of the target sequence vector.

DETAILED DESCRIPTION

The present technology will now be described with respect to the following exemplary systems and methods.

Figure 1:
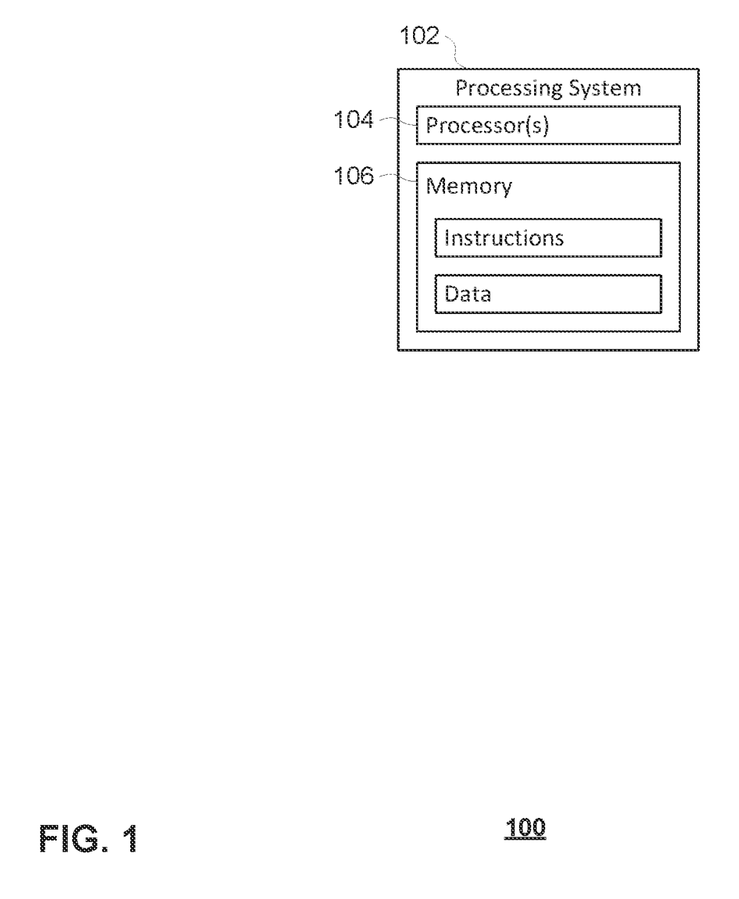
FIG. 1 is a functional diagram of an example system in accordance with aspects of the disclosure.

A high-level system diagram 100 of an exemplary processing system for performing the methods described herein is shown in FIG. 1. The processing system 102 may include one or more processors 104 and memory 106 storing instructions and data. The instructions and data may include the models described herein. Processing system 102 may be resident on a single computing device. For example, processing system 102 may be a server, personal computer, or mobile device, and the models described herein may thus be local to that single computing device. Similarly, processing system 102 may be resident on a cloud computing system or other distributed system, such that the models described herein are distributed across two or more different physical computing devices.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Figure 2:
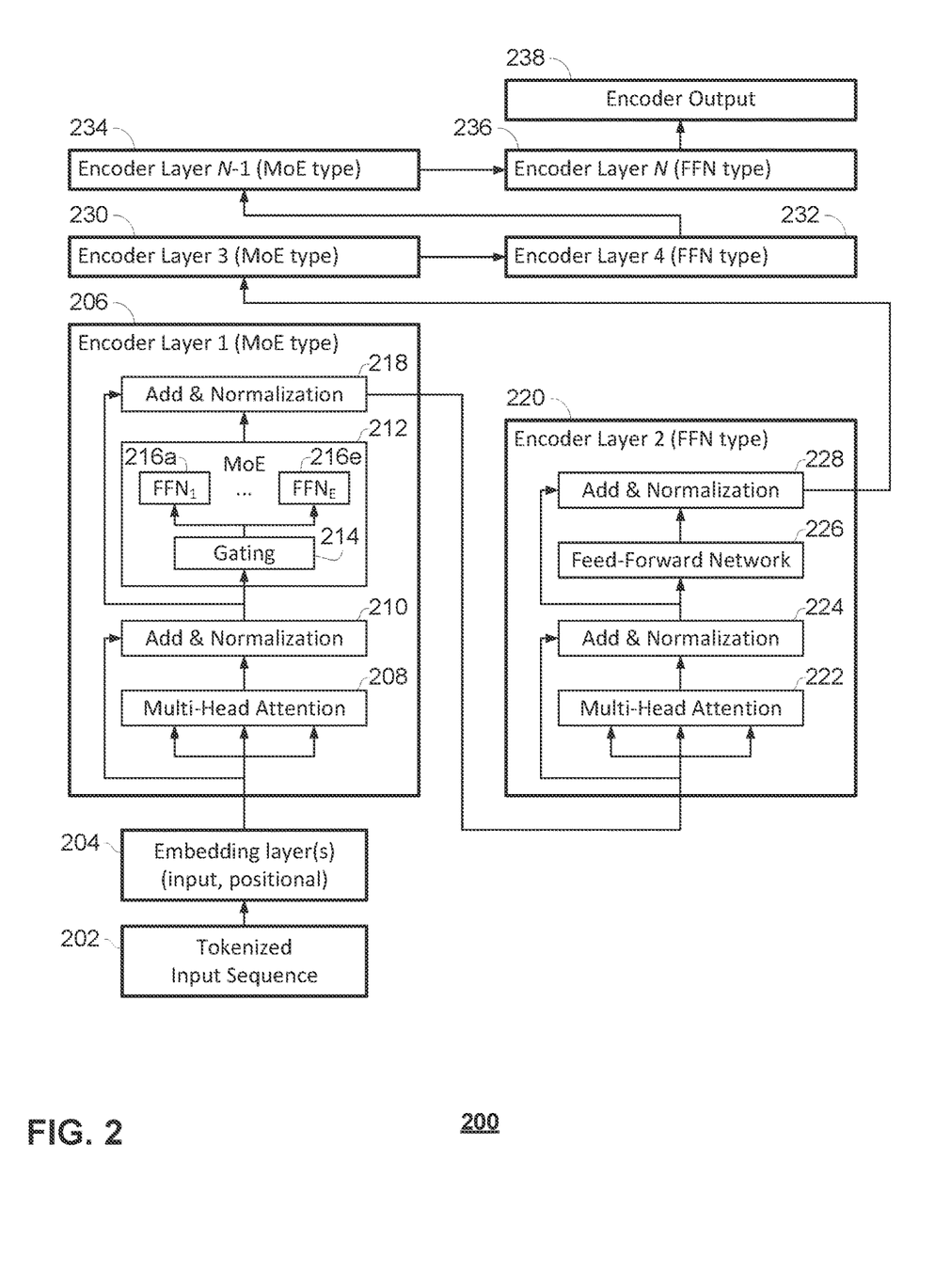
FIG. 2 is a functional diagram of an exemplary encoder architecture for a transformer according to aspects of the present technology.

FIG. 2 depicts an exemplary encoder architecture 200 for a transformer according to aspects of the present technology. In that regard, in the example of FIG. 2, a tokenized input sequence 202 is the initial input. The tokenized input sequence may be a tokenized form of any type of sequence (e.g., a word, sentence fragment, sentence, paragraph, etc.), and may be tokenized using any suitable method. For example, if the transformer is a multi-lingual translation model, the processing system 102 may generate the tokenized input sequence 202 by replacing the individual words (or smaller wordpieces) of a sentence to be translated with representative tokens.

The tokenized input sequence 202 is then processed in one or more embedding layers 204 to create a vector for each token. In the example of FIG. 2, the embedding layers 204 include an input embedding layer that converts each token into a representative vector, and a positional embedding layer that adds positional information representing where the token exists within the overall tokenized input sequence 202. Any suitable embedding functions may be used to create the token vectors, including further embeddings beyond those shown in the example of FIG. 2.

Each token vector is passed to the first encoder layer 206. In the example of FIG. 2, the first encoder layer 206 comprises a multi-head attention sublayer 208, a first normalization sublayer 210, an MoE sublayer 212, and a second normalization sublayer 218. Each token vector passed into the first encoder layer 206 is connected to the multi-head attention sublayer 208, as well as to the first normalization sublayer 210 through a residual connection. The first normalization sublayer 210 concatenates the token vector with the output of the multi-head attention sublayer 208, and normalizes the resulting vector.

Likewise, the output of the first normalization sublayer 210 is connected to the MoE sublayer 212, as well as to the second normalization sublayer 218 through another residual connection. The second normalization sublayer 218 concatenates the output of the first normalization sublayer 210 with the output of the MoE sublayer 212, and normalizes the resulting vector.

The MoE sublayer 212 comprises a learned gating function 214 and a set of E expert feed-forward networks 216a-216e ($FFN_1$ through $FFN_E$). E may be any suitable number such as 32, 128, etc. The learned gating function 214 is configured to process the output of the first normalization sublayer 210, route it to two or more selected expert feed-forward networks (from amongst the set of expert feed-forward networks 216a-216e), and combine the output of those two or more selected expert feed-forward networks to create a single vector to be output from the MoE sublayer 212. In that regard, in some examples, the learned gating function 214 may be configured to compute a vector identifying which expert feed-forward networks the output of the first normalization sublayer 210 should be routed to, and what weight should be accorded to each selected expert's output in order to create a final output for the MoE sublayer 212.

As the learned gating function 214's routing decisions are based on its training, it will determine which expert feed-forward networks to route to based on whatever criteria it has been trained to prioritize. In that regard, the learned gating function 214 may be trained to make routing decisions that optimize balancing among all available expert feed-forward networks (e.g., selecting experts in an effort to avoid underutilizing experts), that optimize quality from each selected expert feed-forward network (e.g., selecting the individual experts most adept at processing a given token), that attempt to balance expert utilization with quality, etc.

In the example of FIG. 2, the output of the second normalization sublayer 218 is passed to the second encoder layer 220. The second encoder layer 220 is identical to the first encoder layer 206, except that it contains a single Feed-Forward Network sublayer 226 rather than an MoE sublayer. As such, for each given token of the tokenized input sequence, the output of the second normalization sublayer 218 is passed into the second encoder layer 220, where it is connected to a multi-head attention sublayer 222, as well as to a first normalization sublayer 224 through a residual connection. Here as well, the first normalization sublayer 224 concatenates the output of the second normalization sublayer 218 (of the first encoder layer 206) with the output of the multi-head attention sublayer 222, and normalizes the resulting vector.

Likewise, the output of the first normalization sublayer 224 is connected to the Feed-Forward Network sublayer 226, as well as to a second normalization sublayer 228 through another residual connection. The second normalization sublayer 228 concatenates the output of the first normalization sublayer 224 with the output of the Feed-Forward Network sublayer 226, and normalizes the resulting vector.

In the example of FIG. 2, the encoder comprises N encoder layers, with all odd-numbered layers containing an MoE sublayer and operating as described with respect to the first encoder layer 206, and all even-numbered layers containing a single feed-forward network sublayer and operating as described with respect to the second encoder layer 220. Thus, the output of the second normalization layer 228 of the second encoder layer 220 is passed to the third encoder layer 230, which is an MoE-type layer that operates similarly to the first encoder layer 206. The output of the third encoder layer 230 is then passed to the fourth encoder layer 232, which is an FFN-type layer that operates similarly to the second encoder layer 220. This process continues for all N encoder layers, with the second-to-last encoder layer 234 (Encoder Layer N−1) being an MoE-type layer, and the last encoder layer 236 (Encoder Layer N) being an FFN-type layer. Each token vector passed into the first encoder layer 206 thus eventually results in a final vector being output from the last encoder layer 236. This output is represented in FIG. 2 as encoder output 238.

Any suitable number N of encoder layers may be used. In that regard, N may be less than or greater than the six encoder layers depicted in FIG. 2. Likewise, in some examples, the MoE sublayers may be included in all even-numbered encoder layers such that the first encoder layer is an FFN-type layer. Further, in some examples, there may be MoE sublayers included in successive encoder layers (e.g., encoder layers 1-3 may be MoE-type layers, and encoder layers 4-6 may be FFN-type layers). Likewise, in some examples, there may be more MoE-type layers than FFN-type layers (e.g., encoder layers 1-3 may be MoE type layers, and encoder layers 4 and 5 may be FFN-type layers), or vice versa (e.g., encoder layers 1-3 may be FFN-type layers, and encoder layers 4 and 5 may be MoE-type layers). Further, in some examples, the encoder may include only a single encoder layer, or may include multiple encoder layers all of which are MoE-type layers.

Figure 3:
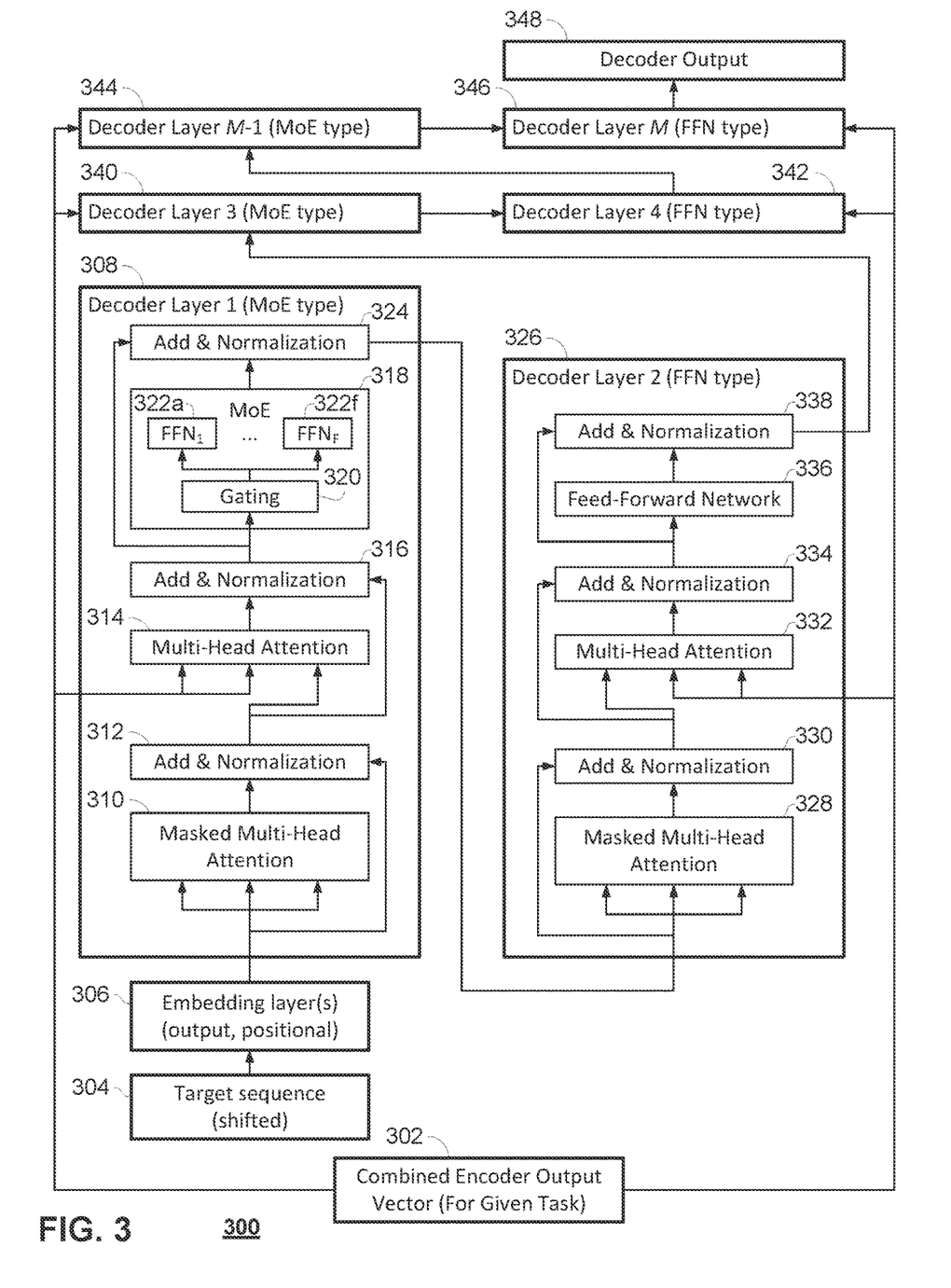
FIG. 3 is a functional diagram of an exemplary decoder architecture for a transformer according to aspects of the present technology.

FIG. 3 depicts an exemplary decoder architecture 300 for a transformer according to aspects of the present technology. In the example of FIG. 3, the inputs to the decoder are a combined encoder output vector 302 created by combining (e.g., stacking) all encoder outputs 238 of FIG. 2 for a given task, and a target sequence 304. Combined encoder output vector 302 may be vector, matrix, or higher-order tensor of any suitable dimension. The processing system 102 must thus wait until the encoder has generated encoder outputs 238 for all tokens of a given task before decoding can begin. In that regard, a task may be defined by any suitable criteria. For example, in the context of a multi-lingual translation model, a task may be a single request to translate a given passage of text from a first language to a second language. Likewise, in the context of a natural language processing model, a task may be a single request to interpret and/or respond to a given natural language command or question.

The target sequence 304 is processed in one or more embedding layers 306 to generate an embedded target sequence vector. In the example of FIG. 3, the embedding layers 306 include an input embedding layer that converts each token into a representative vector, and a positional embedding layer that adds positional information representing where the token exists within the overall target sequence 304. Any suitable embedding functions may be used to create the token vectors, including further embeddings beyond those shown in the example of FIG. 3.

Initially, target sequence 304 will comprise a start-of-sequence token (or other type of token representing the beginning of a sequence) and no other entries. As such, before the first pass through the decoder, the first element of the embedded target sequence vector will be a value representing the start-of-sequence token as the first element, and the remaining elements of the embedded target sequence vector will be empty. The first pass through all M layers of the decoder will result in a decoder output 348 representing the decoder's prediction for the first token of the target sequence. A value representing that predicted token will be added to the embedded target sequence vector as its second element, and the updated embedded target sequence vector will then be fed back into the one or more embedding layers 306 for a second pass through all M layers of the decoder.

The second pass will result in a decoder output 348 representing the decoder's prediction for the second token of the target sequence. A value representing that predicted token will be added to the embedded target sequence vector as its third element, and the updated embedded target sequence vector will again be fed back into the one or more embedding layers 306 for a third pass through all M layers of the decoder to predict the third token. This process will continue to repeat until the decoder predicts and end-of-sequence token (or other type of token indicating that the target sequence vector now represents a full sequence). The target sequence 304 and its corresponding embedded target sequence vector are thus "shifted" by one element, because the decoder's prediction based on the first token of the input sequence is stored as the second element of the embedded target sequence vector, and so on.

The embedded target sequence vector is passed to the first decoder layer 308. In the example of FIG. 3, the first decoder layer 308 comprises a masked multi-head attention sublayer 310, a first normalization sublayer 312, a multi-head attention sublayer 314, a second normalization sublayer 316, an MoE sublayer 318, and a third normalization sublayer 324. The embedded target sequence vector passed into the first decoder layer 308 is connected to the masked multi-head attention sublayer 310, as well as to the first normalization sublayer 312 through a residual connection. The first normalization sublayer 312 concatenates the embedded target sequence vector with the output of the masked multi-head attention sublayer 310, and normalizes the resulting vector.

Likewise, the output of the first normalization sublayer 312 is connected to the multi-head attention sublayer 314, as well as to the second normalization sublayer 316 through another residual connection. The combined encoder output vector 302 is also connected to the multi-head attention sublayer 314. The second normalization sublayer 316 concatenates the output of the first normalization sublayer 312 with the output of the multi-head attention sublayer 314, and normalizes the resulting vector.

Further, the output of the second normalization sublayer 316 is connected to the MoE sublayer 318, as well as to the third normalization sublayer 324 through yet another residual connection. The third normalization sublayer 324 concatenates the output of the second normalization sublayer 316 with the output of the MoE sublayer 318, and normalizes the resulting vector.

The MoE sublayer 318 comprises a learned gating function 320 and a set of F expert feed-forward networks 322a-322f ($FFN_1$ through $FFN_F$). F may be any suitable number such as 32, 128, etc. The learned gating function 320 is configured to process the output of the second normalization sublayer 316, route it to two or more selected expert feed-forward networks (from amongst the set of expert feed-forward networks 322a-322f), and combine the output of those two or more selected expert feed-forward networks to create a single vector to be output from the MoE sublayer 318. In that regard, in some examples, the learned gating function 320 may be configured to compute a vector identifying which expert feed-forward networks the output of the second normalization sublayer 316 should be routed to, and what weight should be accorded to each selected expert's output in order to create a final output for the MoE sublayer 318.

Here as well, as the learned gating function 320's routing decisions are based on its training, it will determine which expert feed-forward networks to route to based on whatever criteria it has learned to prioritize. In that regard, the learned gating function 320 may be trained to make routing decisions that optimize balancing among all available expert feed-forward networks (e.g., selecting experts in an effort to avoid underutilizing experts), that optimize quality from each selected expert feed-forward network (e.g., selecting the individual experts most adept at processing the given task), that attempt to balance expert utilization with quality, etc.

In the example of FIG. 3, the output of the third normalization sublayer 324 is passed to the second decoder layer 326. The second decoder layer 326 is identical to the first decoder layer 308, except that it contains a single Feed-Forward Network sublayer 336 rather than an MoE sublayer. As such, the output of the third normalization sublayer 324 is passed into the second decoder layer 326, where it is connected to a masked multi-head attention sublayer 328, as well as to a first normalization sublayer 330 through a residual connection. Here as well, the first normalization sublayer 330 concatenates the output of the third normalization sublayer 324 (of the first decoder layer 324) with the output of the masked multi-head attention sublayer 328, and normalizes the resulting vector.

Likewise, the output of the first normalization sublayer 330 is connected to the multi-head attention sublayer 332, as well as to the second normalization sublayer 334 through another residual connection. Here as well, the combined encoder output vector 302 is additionally connected to the multi-head attention sublayer 314. The second normalization sublayer 334 concatenates the output of the first normalization sublayer 330 with the output of the multi-head attention sublayer 332, and normalizes the resulting vector.

Further, the output of the second normalization sublayer 334 is connected to the Feed-Forward Network sublayer 336, as well as to a third normalization sublayer 338 through another residual connection. The third normalization sublayer 338 concatenates the output of the second normalization sublayer 334 with the output of the Feed-Forward Network sublayer 336, and normalizes the resulting vector.

In the example of FIG. 3, the decoder comprises M encoder layers, with all odd-numbered layers containing an MoE sublayer and operating as described with respect to the first decoder layer 308, and all even-numbered layers containing a single feed-forward network sublayer and operating as described with respect to the second decoder layer 326. Thus, the output of the third normalization layer 338 of the second decoder layer 326 is passed to the third decoder layer 340, which is an MoE-type layer that operates similarly to the first decoder layer 308. The output of the third decoder layer 340 is then passed to the fourth decoder layer 342, which is an FFN-type layer that operates similarly to the second decoder layer 326. This process continues for all M encoder layers, with the second-to-last decoder layer 344 (Decoder Layer M–1) being an MoE-type layer, and the last encoder layer 346 (Decoder Layer M) being an FFN-type layer. The output from the last decoder layer 346 is represented as decoder output 348. As noted above, the decoder output 348 will be the prediction for the current token of the target sequence 304, and will be used to update the embedded target sequence vector. The updated embedded target sequence vector will then be passed back into the model for another pass through all M layers. This process will repeat until the decoder predicts an end-of-sequence token (or other type of token indicating that the target sequence vector now represents a full sequence), at which point the decoder output 348 will represent the model's final prediction for the entire target sequence 304.

Any suitable number M of decoder layers may be used. In that regard, M may be less than or greater than the six decoder layers depicted in FIG. 3. Likewise, in some examples, the MoE sublayers may be included in all even-numbered decoder layers such that the first decoder layer is an FFN-type layer. Further, in some examples, there may be MoE sublayers included in successive decoder layers (e.g., decoder layers 1-3 may be MoE-type layers, and decoder layers 4-6 may be FFN-type layers). Likewise, in some examples, there may be more MoE-type layers than FFN-type layers (e.g., decoder layers 1-3 may be MoE type layers, and decoder layers 4 and 5 may be FFN-type layers), or vice versa (e.g., decoder layers 1-3 may be FFN-type layers, and decoder layers 4 and 5 may be MoE-type layers). Further, in some examples, the decoder may include only a single decoder layer, or may include multiple decoder layers all of which are MoE-type layers.

Figure 4:
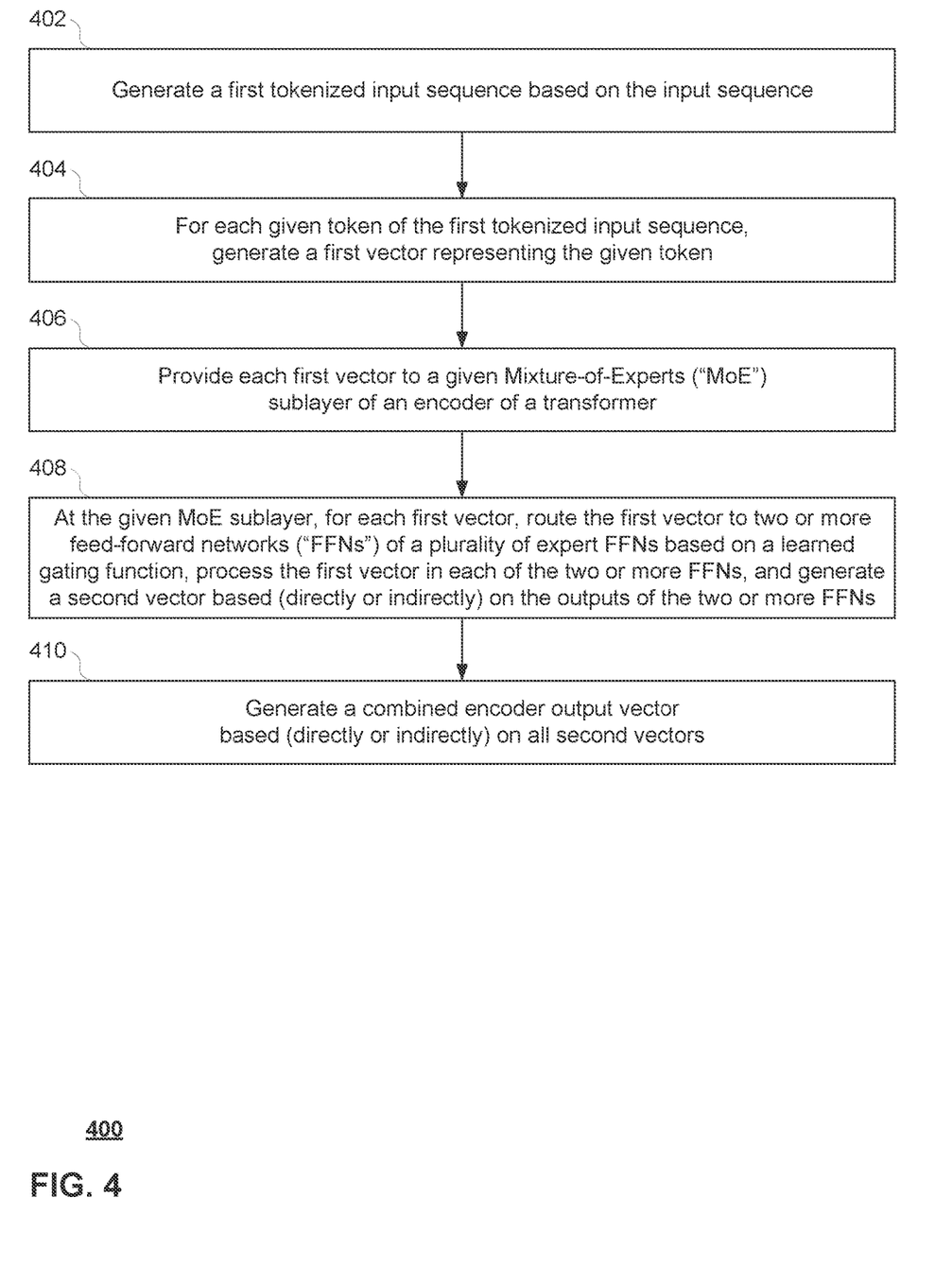
FIG. 4 is a flow diagram showing an exemplary method for processing an input sequence in an encoder of a transformer during inference, according to aspects of the present technology.

FIG. 4 depicts an exemplary method 400 showing how processing system 102 may process an input sequence in an encoder of a transformer during inference, according to aspects of the present technology. In step 402, the processing system 102 generates a first tokenized input sequence based on the input sequence. The input sequence may be any sequence of text (e.g., a word, sentence fragment, sentence, paragraph, etc.). As discussed above, the tokenized input sequence may be generated using any suitable method (e.g., by replacing individual words (or smaller wordpieces) of the input sequence with representative tokens).

In step 404, for each token of the first tokenized input sequence, the processing system 102 generates a first vector representing that token. In some examples, this first vector may be a vector generated by processing the first tokenized input sequence in one or more embedding layers, such as an input embedding layer that converts each token into a representative vector, and a positional embedding layer that adds positional information representing where each token exists within the first tokenized input sequence. In such a case, any suitable embedding functions may be used to create the first vector for each token, including further embeddings beyond those discussed here and shown in the example of FIG. 2 above. In some examples, the first vector may be a vector which results from processing a vector representing the given token (e.g., a vector encoded as just described) through one or more layers of the encoder of the transformer.

In step 406, the processing system 102 passes each first vector to a given MoE sublayer of the encoder of the transformer. The encoder may have any suitable architecture which includes at least one mixture-of-experts sublayer, such as those shown and described above with respect to FIG. 2. In that regard, and as set forth above, the encoder may have more than one MoE sublayer.

In step 408, at the given MoE sublayer of the encoder, for each first vector, the processing system 102 routes the first vector to two or more expert feed-forward networks ("FFNs") of a plurality of expert FFNs based on a learned gating function. The processing system 102 then processes each first vector at the two or more expert FFNs to which it was routed, and generates a second vector based on the outputs of the two or more expert FFNs. As each first vector corresponds to a given token, the second vector generated based thereon likewise corresponds to that given token. In some examples, the second vector may be based directly on the outputs of the selected two or more expert FFNs, such as by calculating a weighted average of the vectors output by the two or more expert FFNs. In some examples, the second vector may be based indirectly on the outputs of the selected two or more expert FFNs. For example, the second vector may be the output of a normalization sublayer which concatenates the first vector with the output of the given MoE sublayer, e.g., as described above with respect to normalization sublayer 218 of FIG. 2.

In step 410, the processing system 102 generates a combined encoder output vector based on all second vectors. The combined encoder output vector thus represents all tokens of the first tokenized input sequence (e.g., the combined encoder output vector may be generated in the same way as the combined encoder output vector 302, as described above), and thus all tokens of the task. In some examples, the combined encoder output vector may be based directly on the second vectors. For example, where the given MoE sublayer is located in the last layer of the encoder, the combined encoder output vector may be generated by combining (e.g., stacking) all second vectors. In some examples, the combined encoder output vector may be based indirectly on the second vectors. For example, where the second vectors are further processed in one or more additional layers of the encoder, the combined encoder output vector may be generated by combining (e.g., stacking) the vectors output by the final layer of the encoder corresponding to each token of the first tokenized input sequence.

Figure 5:
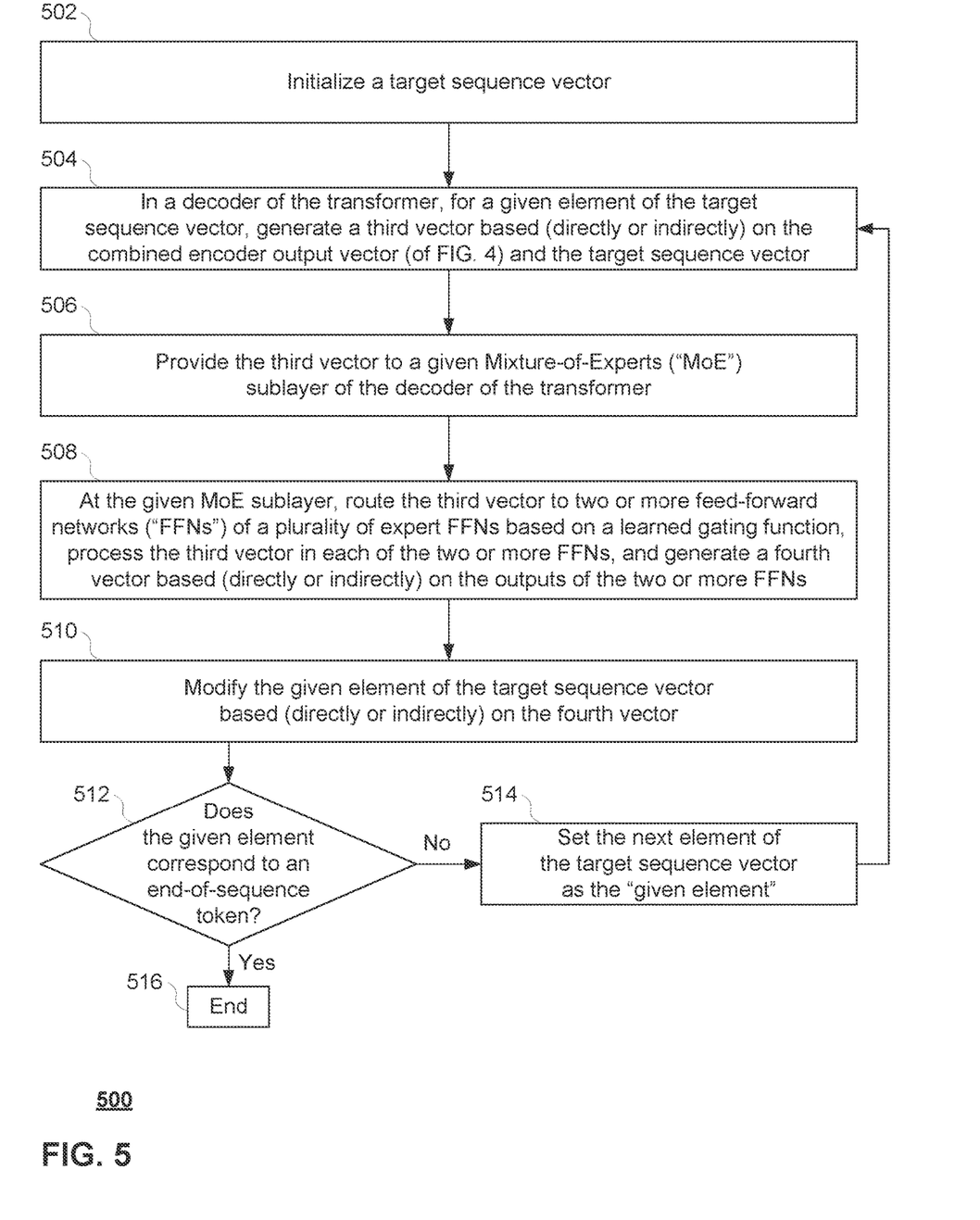
FIG. 5 is a flow diagram showing an exemplary method for processing the combined encoder output vector of FIG. 4 in a decoder of a transformer during inference, according to aspects of the present technology.

FIG. 5 depicts an exemplary method 500 showing how processing system 102 may process the combined encoder output vector of FIG. 4 in a decoder of a transformer during inference, according to aspects of the present technology.

In step 502, the processing system 102 initializes a target sequence vector. This target sequence vector may be any suitable vector for storing the predictions of the decoder as to each token of the output sequence for a given task. For example, the target sequence vector may be generated as described above with respect to FIG. 3 by applying one or more embedding functions to a target sequence comprising only a start-of-sequence token.

In step 504, for a given element of the target sequence vector, the processing system 102 generates a third vector based on the combined encoder output vector (of FIG. 4) and the target sequence vector using a decoder of the transformer. In some examples, the third vector may be based directly on the combined encoder output vector (of FIG. 4) and the target sequence vector. For example, the third vector may be the output of a multi-head attention sublayer or subsequent normalization sublayer in the first layer of the decoder (e.g., multi-head attention sublayer 314 or normalization sublayer 316 of FIG. 3). In some examples, the third vector may be based indirectly on the combined encoder output vector (of FIG. 4) and the target sequence vector. In that regard, as the vector output by the first layer of the decoder will be passed to the second layer of the decoder (and so on), the third vector may also be the output of a multi-head attention sublayer or normalization sublayer within any subsequent decoder layer (e.g., multi-head attention sublayer 332 or normalization sublayer 334 of FIG. 3, or corresponding sublayers in any of Decoder Layers 3 through M of FIG. 3).

In step 506, the processing system 102 passes the third vector to a given MoE sublayer of the decoder of the transformer. The decoder may have any suitable architecture which includes at least one mixture-of-experts sublayer, such as those shown and described above with respect to FIG. 3. In that regard, and as set forth above, the decoder may have more than one MoE sublayer.

In step 508, at the given MoE sublayer of the decoder, the processing system 102 routes the third vector to two or more expert feed-forward networks ("FFNs") of a plurality of expert FFNs based on a learned gating function. The processing system 102 then processes the third vector at the two or more expert FFNs to which it was routed, and generates a fourth vector based on the outputs of the two or more expert FFNs. In some examples, the fourth vector may be based directly on the outputs of the selected two or more expert FFNs, such as by calculating a weighted average of the vectors output by the two or more expert FFNs. In some examples, the fourth vector may be based indirectly on the outputs of the selected two or more expert FFNs. For example, the fourth vector may be the output of a normalization sublayer which concatenates the third vector with the output of the given MoE sublayer, e.g., as described above with respect to normalization sublayer 324 of FIG. 3.

In step 510, the processing system 102 modifies the given element of the target sequence vector based on the fourth vector. With this update, the target sequence vector will now include a value representing the decoder's final prediction for the given element. In some examples, the update to the target sequence vector may be based directly on the fourth vector. For example, where the given MoE sublayer is located in the last layer of the decoder, the target sequence vector may be updated by concatenating the fourth vector with the third vector and normalizing the resulting vector, e.g., as described above with respect to the third normalization sublayer 324 of FIG. 3. In some examples, the update to the target sequence vector may be based indirectly on the fourth vector. For example, where the fourth vector is passed on to an additional layer of the decoder, the target sequence vector may be updated by processing the fourth vector in the next layer of the decoder, and passing the output of that layer to the next layer after that (and so on) until it results in an output from the final layer of the decoder.

Pursuant to step 512, if the given element of the updated target sequence vector corresponds to an end-of-sequence token (or other type of token indicating that the target sequence vector now represents a full sequence), then the processing system 102 sets the next element of the target sequence vector as the "given element" and repeats steps 504-512 for the new "given element." This flow is shown by the by "No" arrow connecting step 512 to step 514, and the return arrow from step 514 to step 504. On the other hand, if the given element of the updated target sequence vector does correspond to an end-of-sequence token (or other type of token indicating that the target sequence vector now represents a full sequence), then the process will end as shown in step 516. Once step 516 is reached, the target sequence vector will represent the model's full prediction based on the input sequence. For example, if the transformer is a multi-lingual translation model tasked with translating an English-language input sequence into Spanish, the final target sequence vector which exists at step 516 will represent the model's final prediction regarding the Spanish translation of that English-language input sequence. In that regard, although not shown in FIG. 5, the processing system 102 may be further configured to convert the final target sequence vector from vector form into a corresponding string of text.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method of processing an input sequence in a transformer having an encoder and a decoder, the method comprising:
   generating, by one or more processors of a processing system, a first tokenized input sequence based on the input sequence, the first tokenized input sequence comprising a plurality of tokens corresponding to a task;
   for each given token of the plurality of tokens, by the one or more processors:
      generating a first vector representing the given token;
      at a first layer of the encoder:
         routing, based on a learned gating function of a mixture-of-experts (MoE) sublayer of the first layer, the first vector to two or more expert feed-forward networks of a set of expert feed-forward networks of the MoE sublayer of the first layer; and generating a second vector based on processing the first vector in the two or more expert feed-forward networks of the set of expert feed-forward networks of the MoE sublayer of the first layer; and at a second layer of the encoder including a single feed-forward network sublayer, generating a third vector based on processing the second vector in the single feed-forward network sublayer;

generating, by the one or more processors, a combined encoder output vector corresponding to the task and based on each third vector for each given token of the plurality of tokens; and for each given element of a plurality of elements in a target sequence vector, by the one or more processors:
generating a fourth vector based on the combined encoder output vector and a target sequence vector;
routing, based on a learned gating function of the decoder, the fourth vector to two or more expert feed-forward networks of a set of expert feed-forward networks of the decoder;
generating a fifth vector based on processing the fourth vector in the two or more expert feed-forward networks of the set of expert feed-forward networks of the decoder; and
modifying the given element of the target sequence vector based on the fifth vector.

2. The method of claim 1, wherein generating the first vector comprises:
processing the given token in an input embedding layer of the transformer; and
processing the first tokenized input sequence in a positional embedding layer of the transformer to add positional information to the first vector representing where the given token exists within the first tokenized input sequence.

3. The method of claim 1, wherein generating the first vector comprises:
processing the given token in one or more embedding layers of the transformer.

4. The method of claim 1, wherein generating the combined encoder output vector comprises stacking each third vector generated for each given token of the plurality of tokens.

5. The method of claim 1, wherein generating the fourth vector comprises:
processing the target sequence vector in a masked multi-head attention sublayer of the decoder and a normalization sublayer of the decoder to generate an intermediate vector; and
processing the combined encoder output vector and the intermediate vector in a multi-head attention sublayer of the decoder to generate the fourth vector.

6. The method of claim 1, wherein generating the fourth vector comprises:
processing the target sequence vector in a masked multi-head attention sublayer of the decoder and a first normalization sublayer of the decoder to generate a first intermediate vector;
processing the combined encoder output vector and the first intermediate vector in a multi-head attention sublayer of the decoder to generate a second intermediate vector; and
processing the first intermediate vector and the second intermediate vector in a second normalization sublayer of the decoder to generate the fourth vector.

7. The method of claim 1, wherein generating the fourth vector comprises:
processing the target sequence vector in one or more embedding layers of the transformer to generate an initial vector representing the target sequence vector;
processing the initial vector in a masked multi-head attention sublayer of the decoder and a normalization sublayer of the decoder to generate an intermediate vector; and
processing the combined encoder output vector and the intermediate vector in a multi-head attention sublayer of the decoder to generate the fourth vector.

8. The method of claim 1, wherein modifying the given element of the target sequence vector comprises:
concatenating the fourth vector and the fifth vector to generate a final decoder output vector; and
assigning the final decoder output vector to the given element of the target sequence vector.

9. The method of claim 1, wherein modifying the given element of the target sequence vector comprises:
concatenating the fourth vector and the fifth vector to generate a sixth vector;
processing the sixth vector in one or more layers of the decoder to generate a final decoder output vector; and
assigning the final decoder output vector to the given element of the target sequence vector.

10. A system for processing an input sequence, comprising:
a memory;
a transformer stored in the memory, the transformer having an encoder and a decoder; and
one or more processors coupled to the memory and configured to:
generate a first tokenized input sequence based on the input sequence, the first tokenized input sequence comprising a plurality of tokens comprising to a task;
for each given token of the plurality of tokens:
generate a first vector representing the given token;
at a first layer of the encoder:
route, based on a learned gating function of a mixture-of-experts (MoE) sublayer of the first layer, the first vector to two or more expert feed-forward networks of a set of expert feed-forward networks of the MoE sublayer of the first layer; and
generate a second vector based on processing the first vector in the two or more expert feed-forward networks of the set of expert feed-forward networks of the MoE sublayer of the first layer; and
at a second layer of the encoder including a single feed-forward network sublayer, generate a third vector based on processing the second vector in the single feed-forward network sublayer;
generate a combined encoder output vector corresponding to the task and based on each third vector for each given token of the plurality of tokens; and
for each given element of a plurality of elements in a target sequence vector:
generate a fourth vector based on the combined encoder output vector and a target sequence vector;
route, based on a learned gating function of the decoder, the fourth vector to two or more expert feed-forward networks of a set of expert feed-forward networks of the decoder;
generate a fifth vector based on processing the fourth vector in the two or more expert feed-forward networks of the set of expert feed-forward networks of the decoder; and modify the given element of the target sequence vector based on the fifth vector.

11. The system of claim 10, wherein the generation of the first vector comprises the one or more processors being configured to:
process the given token in an input embedding layer of the transformer; and
process the first tokenized input sequence in a positional embedding layer of the transformer to add positional information to the first vector representing where the given token exists within the first tokenized input sequence.

12. The system of claim 10, wherein the generation of the first vector comprises the one or more processors being configured to:
process the given token in one or more embedding layers of the transformer.

13. The system of claim 10, wherein the generation of the combined encoder output vector comprises the one or more processors being configured to stack each third vector generated for each given token of the plurality of tokens.

14. The system of claim 10, wherein the generation of the fourth vector based comprises the one or more processors being configured to:
process the target sequence vector in a masked multi-head attention sublayer of the decoder and a normalization sublayer of the decoder to generate an intermediate vector; and
process the combined encoder output vector and the intermediate vector in a multi-head attention sublayer of the decoder to generate the fourth vector.

15. The system of claim 10, wherein the generation of the fourth vector comprises the one or more processors being configured to:
process the target sequence vector in a masked multi-head attention sublayer of the decoder and a first normalization sublayer of the decoder to generate a first intermediate vector;
process the combined encoder output vector and the first intermediate vector in a multi-head attention sublayer of the decoder to generate a second intermediate vector; and
process the first intermediate vector and the second intermediate vector in a second normalization sublayer of the decoder to generate the fourth vector.

16. The system of claim 10, wherein the generation of the fourth vector comprises the one or more processors being configured to:
process the target sequence vector in one or more embedding layers of the transformer to generate an initial vector representing the target sequence vector;
process the initial vector in a masked multi-head attention sublayer of the decoder and a normalization sublayer of the decoder to generate an intermediate vector; and
process the combined encoder output vector and the intermediate vector in a multi-head attention sublayer of the decoder to generate the fourth vector.

17. The system of claim 10, wherein the modification of the given element of the target sequence vector comprises the one or more processors being configured to:
concatenate the fourth vector and the fifth vector to generate a final decoder output vector; and
assign the final decoder output vector to the given element of the target sequence vector.

18. The system of claim 10, wherein the modification of the given element of the target sequence vector comprises the one or more processors being configured to:
concatenate the fourth vector and the fifth vector to generate a sixth vector;
process the sixth vector in one or more layers of the decoder to generate a final decoder output vector; and
assign the final decoder output vector to the given element of the target sequence vector.

\* \* \* \* \*